United States Patent [19]
Austin

[11] Patent Number: 5,915,723
[45] Date of Patent: Jun. 29, 1999

[54] COLLAPSIBLE UTILITY CART

[76] Inventor: Gloria E. Austin, 245-16 149th Rd., Rasedale, N.Y. 11422

[21] Appl. No.: 08/833,163

[22] Filed: Apr. 4, 1997

[51] Int. Cl.$^6$ ........................................... B62B 3/02
[52] U.S. Cl. ..................... 280/651; 280/43; 280/47.35; 280/47.371
[58] Field of Search ................. 280/642, 47.35, 280/47.371, 651, 47.38, 644, 655, 658, 654

[56] References Cited

U.S. PATENT DOCUMENTS

| | | | |
|---|---|---|---|
| 2,141,881 | 12/1938 | Schray | 280/36 |
| 2,212,053 | 8/1940 | Smith | 280/36 |
| 2,582,435 | 1/1952 | Howard | 280/36 |
| 2,743,937 | 5/1956 | Ginsber | 280/41 |
| 2,901,262 | 8/1959 | Berlin | 280/41 |
| 3,037,786 | 6/1962 | Shackel | 280/47.35 |
| 3,052,484 | 9/1962 | Huffman et al. | 280/36 |
| 3,074,734 | 1/1963 | Munsen et al. | 280/41 |
| 3,170,709 | 2/1965 | Shackel | 280/47.34 |
| 3,309,100 | 3/1967 | Barbuti | 280/33.99 |
| 3,640,544 | 2/1972 | Buonassissi | 280/47.35 |
| 3,679,223 | 7/1972 | Sakal | 280/37 |
| 4,369,987 | 1/1983 | Witherell | 280/644 |
| 4,448,434 | 5/1984 | Anderson | 280/40 |
| 4,865,346 | 9/1989 | Carlile | 280/654 |
| 4,969,656 | 11/1990 | Clausen | 280/47.38 |
| 5,547,205 | 8/1996 | Do Rosario Sousa De Cabedo | 280/30 |
| 5,626,352 | 5/1997 | Grace | 280/47.29 |

Primary Examiner—Lanna Mai
Assistant Examiner—Bridget Avery

[57] ABSTRACT

A collapsible utility cart including a frame having an upper pivotal component, a lower pivotal component and side components positioned therebetween. The frame has an extended orientation and a collapsed orientation. The frame has wheels disposed in corners thereof. An inner basket is dimensioned for securement within the frame. A locking component is provided to lock the frame in a collapsed orientation. A telescopic handle is pivotally coupled to the frame.

10 Claims, 4 Drawing Sheets

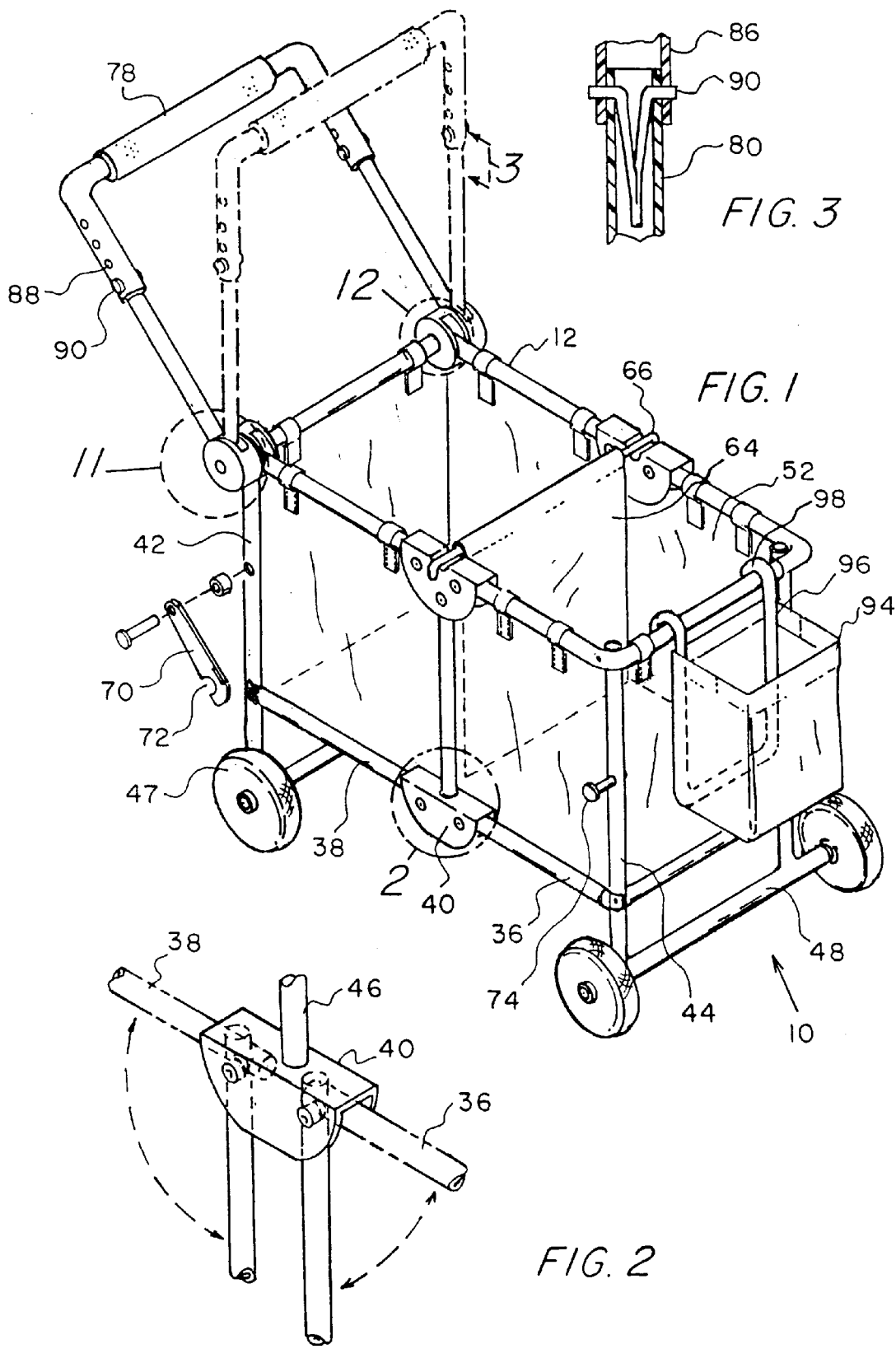

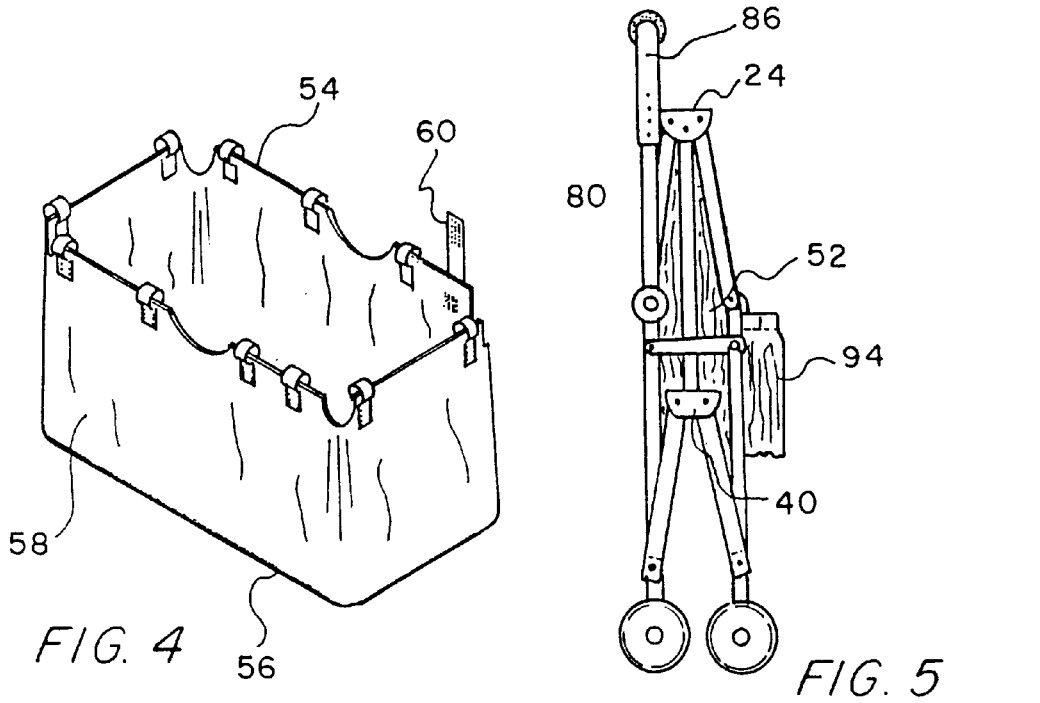
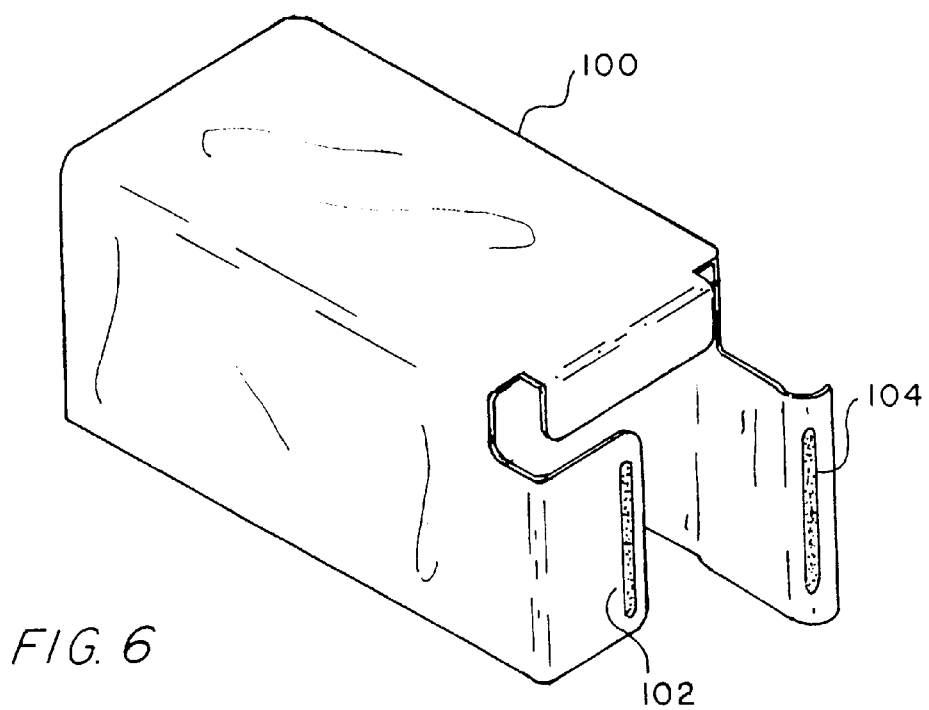

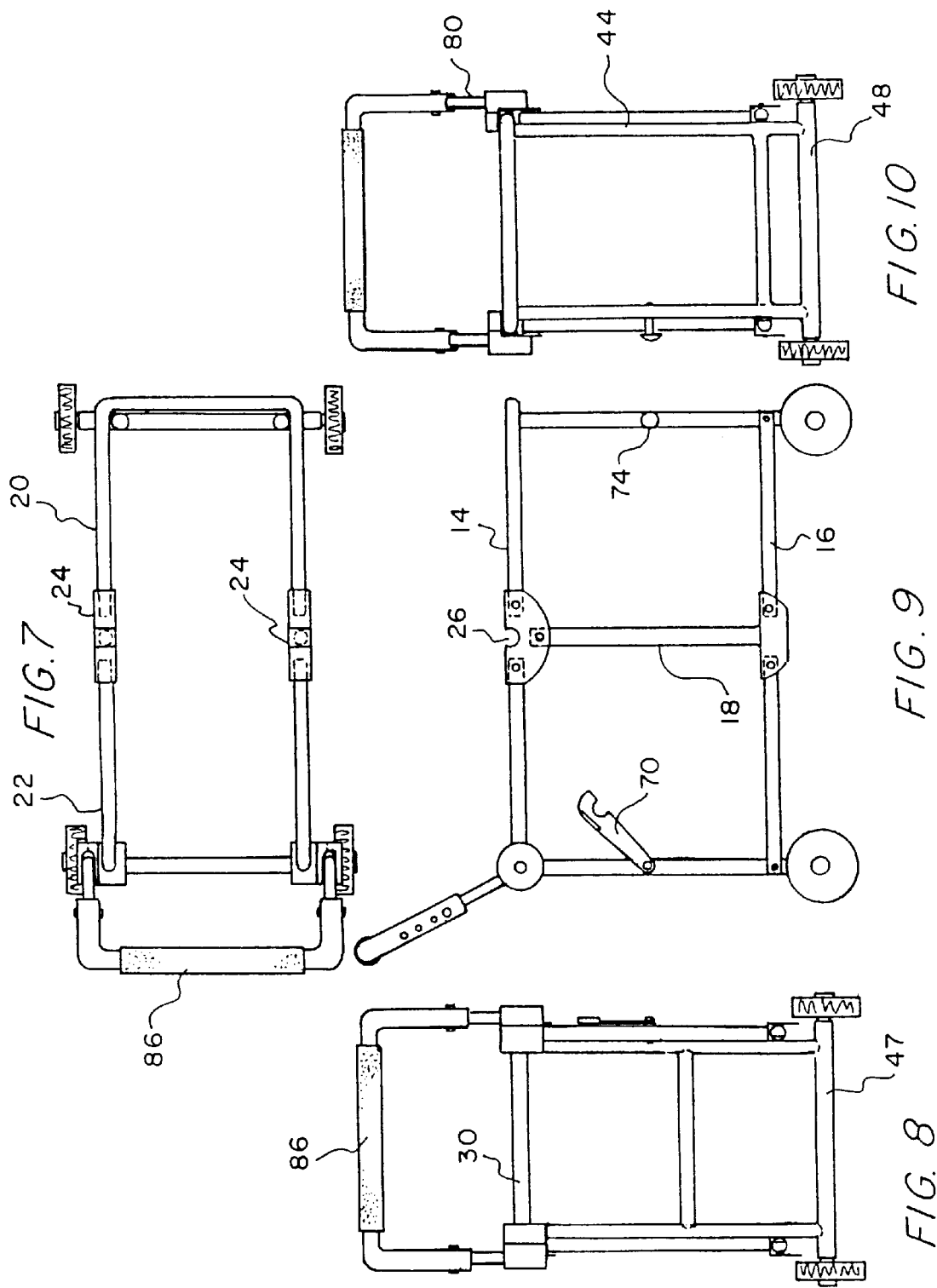

COLLAPSIBLE UTILITY CART

BACKGROUND OF THE INVENTION

1. Field of the Invention

The present invention relates to a collapsible utility cart and more particularly pertains to transporting laundry and the like in an efficient manner with a collapsible utility cart.

2. Description of the Prior Art

The use of laundry carts is known in the prior art. More specifically, laundry carts heretofore devised and utilized for the purpose of categorizing laundry for transport are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,294,009 to Maurer et al. discloses a laundry cart apparatus.

U.S. Pat. No. 4,549,748 to Haley, Sr. discloses a transportable and collapsible bag carrying cart.

U.S. Pat. No. 4,428,442 to Barrett discloses a laundry cart with a plurality of nesting hampers.

U.S. Pat. No. 3,945,660 to Zalewski discloses a structure for folding shopping carts, laundry carts and the like.

U.S. Pat. No. Des. 292,135 to Grube et al. discloses the ornamental design for a collapsible cart.

U.S. Pat. No. 5,040,811 to Buken et al. discloses a molded plastic utility cart.

While these devices fulfill their respective, particular objective and requirements, the aforementioned patents do not describe a collapsible utility cart for transporting laundry and the like in an efficient manner.

In this respect, the collapsible utility cart according to the present invention substantially departs from the conventional concepts and designs of the prior art, and in doing so provides an apparatus primarily developed for the purpose of transporting laundry and the like in an efficient manner.

Therefore, it can be appreciated that there exists a continuing need for new and improved collapsible utility cart which can be used for transporting laundry and the like in an efficient manner. In this regard, the present invention substantially fulfills this need.

SUMMARY OF THE INVENTION

In the view of the foregoing disadvantages inherent in the known types of laundry carts now present in the prior art, the present invention provides an improved collapsible utility cart. As such, the general purpose of the present invention, which will be described subsequently in greater detail, is to provide a new and improved collapsible utility cart and method which has all the advantages of the prior art and none of the disadvantages.

To attain this, the present invention essentially comprises a frame having a generally rectangular configuration. The frame includes an upper pivotal component, a lower pivotal component and side components positioned therebetween. The upper pivotal component comprises a front U-shaped member and a rear U-shaped member with free ends of the U-shaped members pivotally coupled together by opposed collapsing hinges to form a rectangular shape. Each of the hinges have a recess formed in an upper surface thereof. The rear U-shaped member has side extents pivotable with respect to a rear extent thereof. The lower pivotal component comprises a front U-shaped member and a rear U-shaped member with free ends of the U-shaped members pivotally coupled together by opposed collapsing hinges to form a rectangular shape. The rear U-shaped member of the lower pivotal component has side extents pivotable with respect to a rear extent thereof. The side components extend between the upper pivotal component and the lower pivotal component. The side components comprise two rear corner supports, two front corner supports and two side supports. Lower ends of the two rear corner supports have a set of rear wheels extending therebetween. Lower ends of the two front corner supports have a set of front wheels extending therebetween. The two side supports extend between the opposed collapsing hinges of the upper and lower pivotal components. An inner basket is dimensioned for securement within the frame. The inner basket has an open upper end, a closed lower end and a surrounding side wall formed into a generally rectangular configuration. The open upper end has a plurality of securement straps extending upwardly therefrom for coupling over the upper pivotal component of the frame for removable securement thereto. The device includes a divider panel comprised of a flexible panel having a rigid support bar extending through an upper portion thereof. The rigid support bar has free ends disposed outwardly of the panel. The divider panel is positionable within the frame with the free ends of the rigid support bar received within the recesses of the opposed hinges of the upper pivotal component. The device includes a locking component comprised of a pivotal arm coupled with one of the two rear corner supports of the frame. The pivotal arm has an arcuate recess extending inwardly of a lower surface thereof. The locking component includes a protrusion extending outwardly from one of the two front corner supports of the frame on a same a side as the pivotal arm. The pivotal arm engages the protrusion to lock the frame in a collapsed orientation. The device includes a telescopic handle having a generally U-shaped configuration. The handle has a pair of elongated members each having lower ends pivotally coupled with opposing ends of the rear extent of the upper pivotal component. The handle has a U-shaped portion having open free ends telescopically receiving upper ends of the pair of elongated members. An expandable pouch is adapted for securement to the front U-shaped member of the upper pivotal component of the frame. The pouch has a securement bar having a downturned upper portion dimensioned for coupling with the front U-shaped member of the upper pivotal component. A cover is dimensioned for placement over the frame when in an extended orientation. The cover has an openable front panel with closure means to facilitate coupling with the frame.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collapsible utility cart which has all the advantages of the prior art laundry carts and none of the disadvantages.

It is another object of the present invention to provide a new and improved collapsible utility cart which may be easily and efficiently manufactured and marketed.

It is a further object of the present invention to provide a new and improved collapsible utility cart which is of durable and reliable construction.

An even further object of the present invention is to provide a new and improved collapsible utility cart which is susceptible of a low cost of manufacture with regard to both materials and labor, and which accordingly is then susceptible of low prices of sale to the consuming public, thereby making such a collapsible utility cart economically available to the buying public.

Even still another object of the present invention is to provide a new and improved collapsible utility cart for transporting laundry and the like in an efficient manner.

Lastly, it is an object of the present invention to provide a new and improved collapsible utility cart including a frame having an upper pivotal component, a lower pivotal component and side components positioned therebetween. The frame has an extended orientation and a collapsed orientation. The frame has wheels disposed in corners thereof. An inner basket is dimensioned for securement within the frame. A locking component is provided to lock the frame in a collapsed orientation. A telescopic handle is pivotally coupled to the frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the collapsible utility cart constructed in accordance with the principles of the present invention.

FIG. 2 is a perspective view of a section of the present invention detailing the collapsibility thereof.

FIG. 3 is a cross-sectional view as taken along line 3—3 of FIG. 1.

FIG. 4 is a perspective view of the interior basket of the present invention.

FIG. 5 is a side elevation view of the present invention illustrated in a collapsed orientation.

FIG. 6 is a plan perspective view of the removable cover of the present invention.

FIG. 7 is a top plan view of the frame of the present invention.

FIG. 8 is a rear elevation view of the frame of the present invention.

FIG. 9 is a side elevation view of the frame of the present invention.

FIG. 10 is a front elevation view of the frame of the present invention.

The same reference numerals refer to the same parts through the various Figures.

DESCRIPTION OF THE PREFERRED EMBODIMENT

With reference now to the drawings, and in particular, to FIGS. 1 through 12 thereof, the preferred embodiment of the new and improved collapsible utility cart embodying the principles and concepts of the present invention and generally designated by the reference number 10 will be described.

Specifically, it will be noted in the various Figures that the device relates to a collapsible utility cart for transporting laundry and the like in an efficient manner. In its broadest context, the device consists of a frame, an inner basket, a divider panel, a locking component, a telescoping handle, an expandable pouch and a cover. Such components are individually configured and correlated with respect to each other so as to attain the desired objective.

Figure 12:
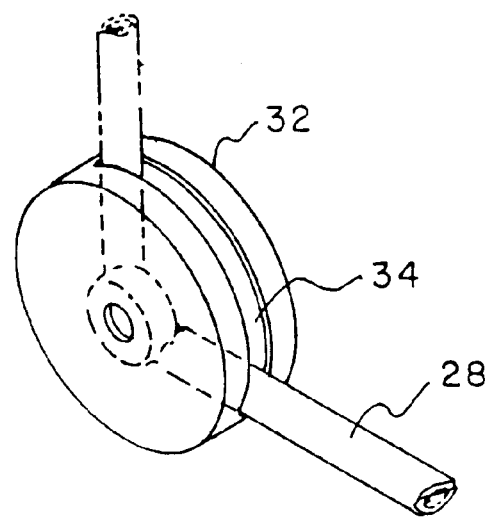
FIG. 12 is a perspective view of the corner collar of the frame of the present invention.

The device 10 includes a frame 12 having a generally rectangular configuration. The frame is illustrated in FIGS. 1, 2, 5, 7–10 and 12. The frame includes an upper pivotal component 14, a lower pivotal component 16 and side components 18 positioned therebetween. These components are pivotable with respect to each other to allow the frame to be closed into a collapsed orientation as illustrated in FIG. 5. The upper pivotal component comprises a front U-shaped member 20 and a rear U-shaped member 22 with free ends of the U-shaped members pivotally coupled together by opposed collapsing hinges 24 to form a rectangular shape. The collapsing hinges are best viewed in FIGS. 1 and 2. The upward lifting of the hinges allow the U-shape members to pivot upwardly thereby allowing for the collapsing of the upper pivotal member. Each of the hinges have a recess 26 formed in an upper surface thereof. The rear U-shaped member has side extents 28 pivotable with respect to a rear extent 30 thereof. FIG. 12 illustrates the side extents received within a circular pivot member 32. The pivot member has a slot 34 through a curved side wall thereof. The slot receives an end of the side extent therein to allow for its rotation with respect to the rear extent. The rear extent is fixedly secured between two circular pivot members. The lower pivotal component is configured essentially the same as the upper pivotal component. The lower pivotal component comprises a front U-shaped member 36 and a rear U-shaped member 38 with free ends of the U-shaped members pivotally coupled together by opposed collapsing hinges 40 to form a rectangular shape. The rear U-shaped member of the lower pivotal component has side extents pivotable with respect to a rear extent thereof. The side components extend between the upper pivotal component and the lower pivotal component. The side components comprise two rear corner supports 42, two front corner supports 44 and two side supports 46. Lower ends of the two rear corner supports have a set of rear wheels 47 extending therebetween. Lower ends of the two front corner supports have a set of front wheels 48 extending therebetween. The two side supports extend between the opposed collapsing hinges of the upper and lower pivotal components. Thus, the lifting of either the hinges of the upper pivotal component or the lower pivotal component will thereby cause the both of the hinges to be lifted. Note FIG. 5.

An inner basket 52 is dimensioned for securement within the frame. The inner basket is best illustrated in FIG. 4. The inner basket has an open upper end 54, a closed lower end 56 and a surrounding side wall 58 formed into a generally rectangular configuration. The open upper end has a plurality of securement straps 60 extending upwardly therefrom for coupling over the upper pivotal component of the frame for removable securement thereto. In the preferred embodiment, the straps are provided with hook and loop fasteners to facilitate securement to the frame. However, other forms of closure could also be employed.

The device 10 also includes a divider panel 64 comprised of a flexible panel having a rigid support bar extending through an upper portion thereof. The rigid support bar has free ends 66 disposed outwardly of the panel. The divider panel is positionable within the frame with the free ends of the rigid support bar received within the recesses of the opposed hinges of the upper pivotal component. The divider panel, as best illustrated in FIG. 1, serves to divide the device into two essentially equal sized compartments for the separation of laundry.

Next, the device includes a locking component comprised of a pivotal arm 70 coupled with one of the two rear corner supports of the frame. The pivotal arm has an arcuate recess 72 extending inwardly of a lower surface thereof. The locking component includes a protrusion 74 extending outwardly from one of the two front corner supports of the frame on a same side as the pivotal arm. The pivotal arm engages the protrusion to lock the frame in a collapsed orientation. The locking component is shown in FIG. 1 in a disengaged orientation and in FIG. 5 in a locked orientation. When the pivotal arm is removed from coupling with the protrusion, the frame is biased into its extended orientation.

Figure 11:
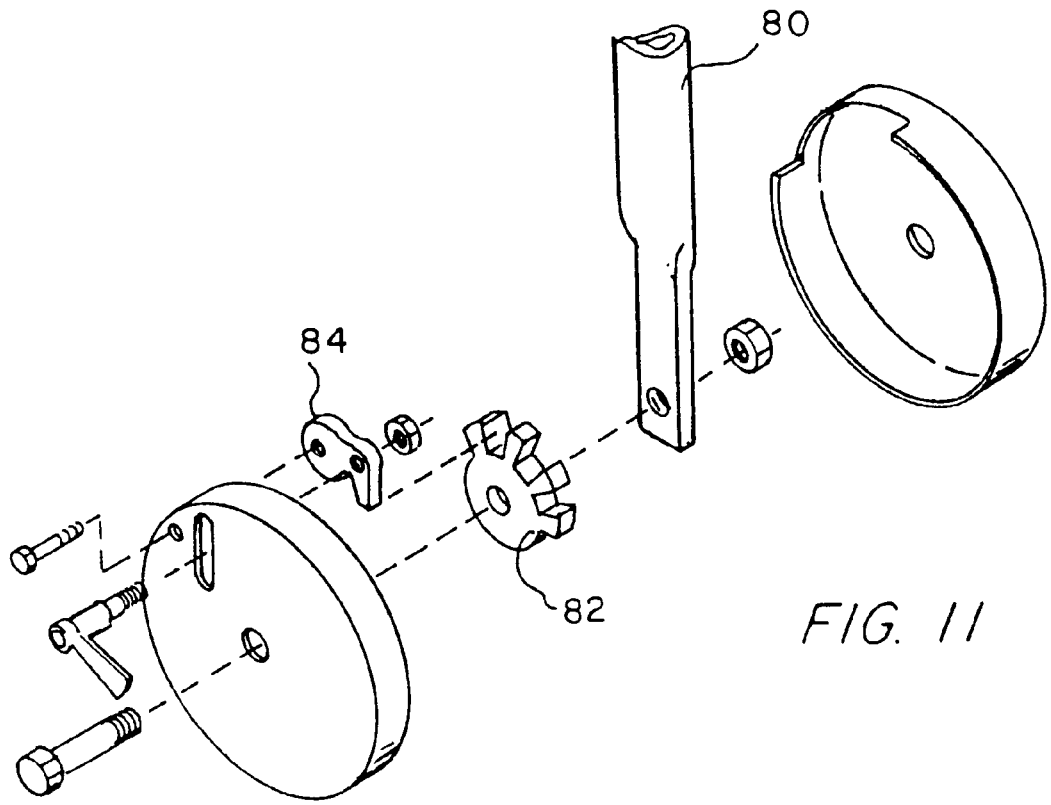
FIG. 11 is a perspective view of the ratchet assembly for the handle of the present invention.

The device includes a telescopic handle 78 having a generally U-shaped configuration. The handle is best seen in FIGS. 1, 3 and 11. The handle has a pair of elongated members 80 each having lower ends pivotally coupled with opposing ends of the rear extent of the upper pivotal component. The preferred pivotal arrangement between the handle and the frame is through the use of a standard ratchet 82 and pawl 84 arrangement as illustrated in FIG. 11. This arrangement allows for the angle of the handle to be adjusted to the optimal elevation suitable to the user. The handle has a U-shaped portion 86 having open free ends telescopically receiving upper ends of the pair of elongated members. The preferred adjustability of the U-shaped portion and the pair of elongated members is illustrated in FIG. 3. In this arrangement, the open free ends of the U-shaped portion are provided with a plurality of apertures 88 for the selective receipt of a spring-biased male member 90 to adjust the height of the handle to best suit the user.

An expandable pouch 94 is adapted for securement to the front U-shaped member of the upper pivotal component of the frame. Note FIG. 1. The pouch has a securement bar 96 having a downturned upper portion 98 dimensioned for coupling with the front U-shaped member of the upper pivotal component. The pouch can be removed when not in use or it can collapse when the cover is in place over the frame. The pouch can be used to carry detergent and the like.

The cover 100 is illustrated in FIG. 6. The cover is dimensioned for placement over the frame when in an extended orientation. The cover has an openable front panel 102 with closure means 104 to facilitate coupling with the frame. The closure means is preferably hook and loop fasteners, but other means of closure could also be employed. The cover is fabricated of a plastic material to serve as a rain and weather repellant for when the device is used outdoors.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A collapsible utility cart for transporting laundry and the like in an efficient manner comprising, in combination:

a frame having a generally rectangular configuration, the frame including an upper pivotal component, a lower pivotal component and side components positioned therebetween, the upper pivotal component comprising a front U-shaped member and a rear U-shaped member with free ends of the U-shaped members pivotally coupled together by opposed collapsing hinges to form a rectangular shape, each of the hinges having a recess formed in an upper surface thereof, the rear U-shaped member having side extents pivotable with respect to a rear extent thereof, the lower pivotal component comprising a front U-shaped member and a rear U-shaped member with free ends of the U-shaped members pivotally coupled together by opposed collapsing hinges to form a rectangular shape, the rear U-shaped member of the lower pivotal component having side extents pivotable with respect to a rear extent thereof, the side components extending between the upper pivotal component and the lower pivotal component, the side components comprising two rear corner supports, two front corner supports and two side supports, lower ends of the two rear corner supports having a set of rear wheels extending therebetween, lower ends of the two front corner supports having a set of front wheels extending therebetween, the two side supports extending between the opposed collapsing hinges of the upper and lower pivotal components;

an inner basket dimensioned for securement within the frame, the inner basket having an open upper end, a closed lower end and a surrounding side wall formed into a generally rectangular configuration, the open upper end having a plurality of securement straps extending upwardly therefrom for coupling over the upper pivotal component of the frame for removable securement thereto;

a divider panel comprised of a flexible panel having a rigid support bar extending through an upper portion thereof, the rigid support bar having free ends disposed outwardly of the panel, the divider panel positionable within the frame with the free ends of the rigid support bar received within the recesses of the opposed hinges of the upper pivotal component;

a locking component comprised of a pivotal arm coupled with one of the two rear corner supports of the frame, the pivotal arm having an arcuate recess extending inwardly of a lower surface thereof, the locking component including a protrusion extending outwardly from one of the two front corner supports of the frame on a same side as the pivotal arm, the pivotal arm engaging the protrusion to lock the frame in a collapsed orientation;

a telescopic handle having a generally U-shaped configuration, the handle having a pair of elongated members each having lower ends pivotally coupled with opposing ends of the rear extent of the upper pivotal component, the handle having a U-shaped portion having open free ends telescopically receiving upper ends of the pair of elongated members;

an expandable pouch adapted for securement to the front U-shaped member of the upper pivotal component of the frame, the pouch having a securement bar having a downturned upper portion dimensioned for coupling with the front U-shaped member of the upper pivotal component; and a cover dimensioned for placement over the frame when in an extended orientation, the cover having an openable front panel with closure means to facilitate coupling with the frame.

2. A collapsible utility cart comprising:

a frame including an upper pivotal component, a lower pivotal component and side components positioned therebetween, the frame having an extended orientation and a collapsed orientation, the frame having wheels disposed in corners thereof;

an inner basket dimensioned for securement within the frame;

a locking component to lock the frame in a collapsed orientation;

a telescopic handle coupled to the frame; and the upper pivotal component comprising a front U-shaped member and a rear U-shaped member with free ends of the U-shaped members pivotally coupled together by opposed collapsing hinges to form a rectangular shape, the rear U-shaped member having side extents pivotable with respect to a rear extent thereof, the lower pivotal component comprising a front U-shaped member and a rear U-shaped member with free ends of the U-shaped members pivotally coupled together by opposed collapsing hinges to form a rectangular shape, the rear U-shaped member of the lower pivotal component having side extents pivotable with respect to a rear extent thereof, the side components extending between the upper pivotal component and the lower pivotal component, the side components comprising two rear corner supports, two front corner supports and two side supports, lower ends of the two rear corner supports having a set of rear wheels extending therebetween, lower ends of the two front corner supports having a set of front wheels extending therebetween, the two side supports extending between the opposed collapsing hinges of the upper and lower pivotal components.

3. The collapsible utility car as set forth in claim 2 and further including a divider panel positionable within the frame to divide the inner basket into two separate compartments.

4. The collapsible utility cart as set forth in claim 2 and further including an expandable pouch adapted for securement to the upper pivotal component of the frame.

5. The collapsible utility cart as set forth in claim 4 wherein the pouch having a securement bar having a downturned upper portion dimensioned for coupling with the upper pivotal component.

6. The collapsible utility cart as set forth in claim 2 and further including a cover dimensioned for placement over the frame when in an extended orientation.

7. The collapsible utility cart as set forth in claim 6 wherein the cover having an openable front panel with closure means to facilitate coupling with the frame.

8. The collapsible utility cart as set forth in claim 2 wherein the inner basket having an open upper end, a closed lower end and a surrounding side wall formed into a generally rectangular configuration, the open upper end having a plurality of securement straps extending upwardly therefrom for coupling over the upper pivotal component of the frame for removable securement thereto.

9. The collapsible utility cart as set forth in claim 2 wherein the locking component comprised of a pivotal arm coupled with one of two rear corner supports of the frame, the pivotal arm having an arcuate recess extending inwardly of a lower surface thereof, the locking component including a protrusion extending outwardly from one of two front corner supports of the frame on a same side as the pivotal arm, the pivotal arm engaging the protrusion to lock the frame in the collapsed orientation.

10. The collapsible utility cart as set forth in claim 2 wherein the telescopic handle having a generally U-shaped configuration, the handle having a pair of elongated members each having lower ends pivotally coupled with opposing ends of a rear extent of the upper pivotal component, the handle having a U-shaped portion having open free ends telescopically receiving upper ends of the pair of elongated members.

* * * * *